July 10, 1962  O. J. MAHA  3,043,639
FLUID PRESSURE CYLINDER

Filed May 22, 1961  2 Sheets-Sheet 1

INVENTOR.
OTTO J. MAHA
BY
John N. Wolfram
ATTORNEY

July 10, 1962  O. J. MAHA  3,043,639
FLUID PRESSURE CYLINDER
Filed May 22, 1961  2 Sheets-Sheet 2

INVENTOR.
OTTO J. MAHA
BY
*John N. Wolfram*
ATTORNEY

United States Patent Office 3,043,639
Patented July 10, 1962

3,043,639
FLUID PRESSURE CYLINDER
Otto J. Maha, Dundee, Ill., assignor to Parker-Hannifin Corporation, Cleveland, Ohio, a corporation of Ohio
Filed May 22, 1961, Ser. No. 111,855
7 Claims. (Cl. 309—2)

This invention relates to fluid pressure cylinders and more particularly to a cylinder so constructed as to facilitate proper alignment of the cylinder with the device to be operated thereby.

In many installations where a fluid pressure cylinder is to be clamped in a fixed position on a support it is desirable to align the bore of the cylinder to a high degree of accuracy with respect to the device to be reciprocated by the cylinder. Thus for example, in a machine tool where the cylinder is to be fixedly attached to the work table of the machine for reciprocating one jaw of a clamping mechanism which is mounted on a dovetail guideway, the axis of the bore of the cylinder should be closely aligned with a line described by the centerpoint of the connection between the piston rod and the jaw as the latter is reciprocated, so that the piston and piston rod will not bind in the cylinder bore and piston rod bearing surfaces, respectively.

It is an object of the present invention to provide surfaces on a fluid pressure cylinder accurately located with respect to the axis of the cylinder bore so that they may be used as reference surfaces in connection with measuring instruments for achieving accurate alignment of such axis with the device to be operated.

It is another object to provide a circular surface at each end of the cylinder which is concentric to the cylinder bore to a high degree of accuracy whereby measurements may be based at any point about the circumference thereof and which is of sufficient width to permit ready access thereto by suitable measuring instruments. Other objects of the invention will be apparent from the following description and from the drawings in which.

Figure 1:
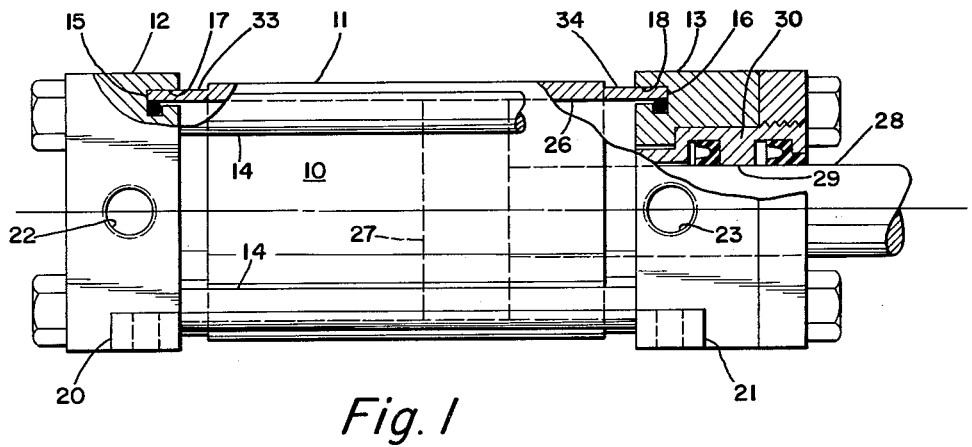
FIG. 1 is an outside view of a cylinder with fragmentary section views at the surfaces to be used as reference measuring points.
Figure 2:
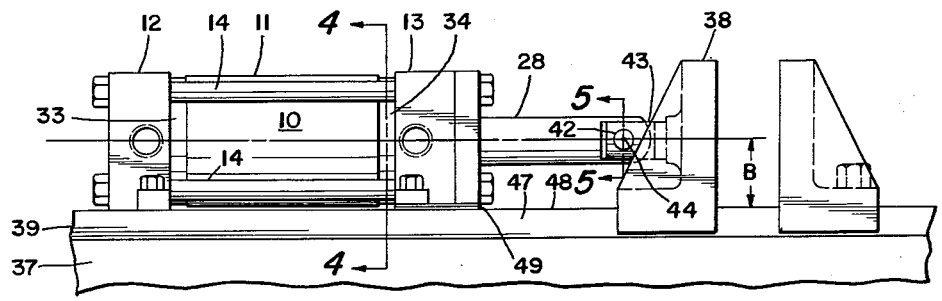
FIG. 2 is a side view of the cylinder mounted on a worktable for operating a clamping mechanism.
Figure 3:
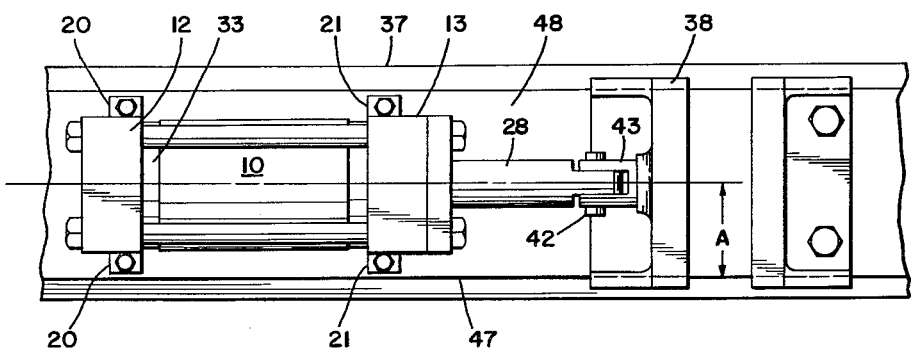
FIG. 3 is a plan view corresponding to FIG. 2.

The cylinder is generally designated by the numeral 10 and includes tubular body 11 having end caps 12 and 13 attached thereto by means of tie rods 14. Cylinder heads 12 and 13 have circular recesses 15 and 16 with circular outer walls 17 and 18, respectively, for receiving the ends of body 11. The cylinder heads have mounting lugs 20, 21 welded thereto by means of which the cylinder may be bolted to a support and also have openings 22, 23 through which fluid may be delivered and exhausted from opposite ends of the cylinder.

Cylinder body 11 has a bore 26 in which is mounted for reciprocation a piston 27. The piston has a rod 28 extending through head 13 and making bearing contact with the inner diameter 29 of a packing gland 30. Gland 24 is so formed and mounted within end cap 13 that bearing surface 29 is concentric with recess wall 18.

Each end of cylinder body 11 is turned down at each end to provide reduced cylindrical surfaces 33 and 34. These surfaces are turned so as to be concentric with bore 26 to a high degree of accuracy, such as on the order of .002 inch maximum total indicator reading. In other words, the wall thickness between bore 26 and cylindrical surfaces 33, 34 is held to a variation of not more than plus or minus .001 inch from a given thickness. As a result, the longitudinal axes of cylindrical reference surfaces 33, 34 are displaced no more than .001 inch from the longitudinal axis of bore 20.

Reference surfaces 33, 34 are sufficiently wide to permit access thereto by conventional measuring equipment, such as by the stylus of an indicator, a blade on a caliper, or by V blocks or other devices used in conjunction with optical equipment. Thus the width of that portion of reference surfaces 33, 34 which is exterior of end caps 12, 13 may be on the order of ¼" to ⅝".

Circular surface 34 projects into recess 16 in end cap 13 and is a close fit with wall 18 whereby bore 26 is maintained in concentric alignment with bearing surface 29. Likewise, surface 33 is a close fit with wall 17 of recess 15 in cap 12.

In a typical installation, cylinder 10 may be mounted on worktable 37 of a machine tool for operating a movable jaw 38 of a clamping mechanism. The movable jaw may be slidably mounted on a guideway 39 of the worktable and have a close fitting dovetail connection therewith. Because of the dovetail mounting, clamping jaw 38 slides in a fixed path. It may be attached to piston rod 28 by a pin 42 through a slotted boss 43 on the clamping jaw with little or no play therebetween whereby a center point 44 at the intersection of the longitudinal axis of rod 28 by a vertical plane through the center of the pin will move in fixed path which is parallel to edge 47 of the dovetail and parallel to top surface 48 thereof.

In order to avoid binding of piston head 27 within bore 26 and of rod 28 within bearing 29, it is necessary that the center lines of bore 26, bearing surface 29, piston head 27 and piston rod 28 be and remain coincident with such fixed path of point 44 at all positions of extension and retraction of piston rod 28.

To achieve this alignment in the typical situation described, clamping jaw 38 is mounted upon dovetail guideway 39 and horizontal distance "A" of point 44 from edge 47 and the vertical distance "B" above top surface 48 of guideway 39 are measured. This may be done by means of conventional machinist measuring devices, as for example micrometers, indicators, and/or vernier calipers.

Figure 4:
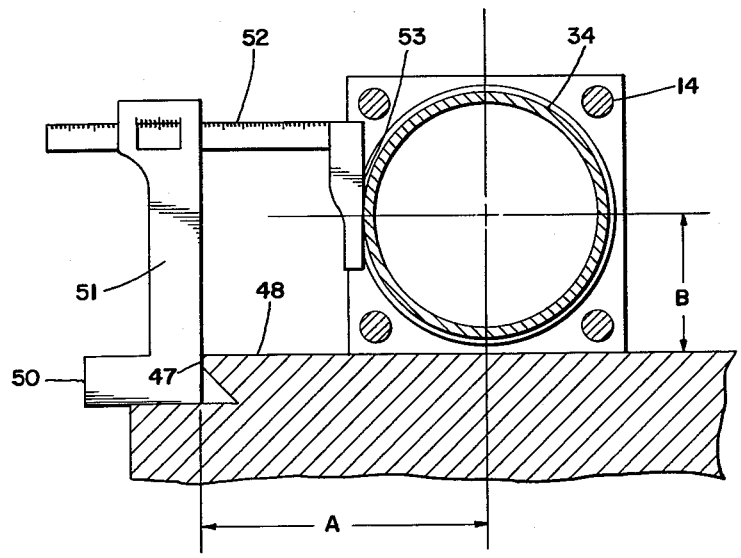
FIG. 4 is a partial cross section view showing how a conventional measurement indicating instrument may be utilized for taking a reading at one of the reference surfaces.
Figure 5:
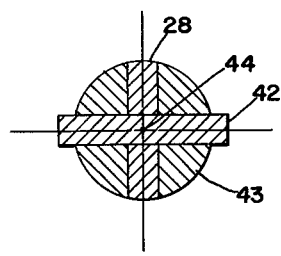
FIG. 5 is a cross section along lines 5—5 of FIG. 2 showing the center point of the connection between the cylinder piston rod and the reciprocable jaw.

Cylinder 10 may then be put into its approximate position on the worktable and maneuvered to the exact desired location by means of the machinist's measuring equipment and using surfaces 33, 34 as reference points. Thus, for example, to locate the center line of bore 20 the same distance "A" from dovetail side edge 47, base 50 of caliper 51 is placed against dovetail edge 47 and caliper bar 52 is set at a horizontal distance away from edge 47 corresponding to the "A" dimension less one half the diameter of surface 34, the exact diameter of the latter having been measured beforehand with a micrometer. The cylinder is then placed with surface 34 in contact with caliper edge 53, as shown in FIG. 4. A like procedure is then followed for the other end of the cylinder, using surface 33 as a reference point.

Similarly, surfaces 33, 34 may be used for locating the vertical position of the cylinder so that the axis of bore 26 is at all points distance "B" above guideway top surface 48. If necessary, shims 49 may be placed under end caps 12 and/or 13 for supporting the cylinder in the proper vertical position.

After the proper location of the cylinder has been determined as described, it may be bolted in position by means of bolts 56 passing through mounting lugs 20, 21.

Although one method of utilizing the reference surfaces in conjunction with machinist's measuring equipment has been described, other methods may also be employed. Thus for long stroke cylinders, as for example ten feet and over, it is usually more satisfactory to use optical equipment, such as a collimator in conjunction with V blocks supported on the reference surfaces and a reference point scribed on the machine upon which the cylinder is to be mounted, for determining the proper alignment.

I claim:

1. A fluid pressure cylinder having a body with a cylindrical bore in which a piston is mounted for reciprocation, said body having an exposed circular reference surface at each end thereof of smaller diameter than said body, said reference surfaces being concentric with said bore whereby they may be used as locating surfaces for locating the position of the axis of said bore with respect to a structure upon which the cylinder is to be mounted.

2. A fluid pressure cylinder in accordance with claim 1 in which said exposed reference surfaces are of substantial width.

3. A fluid pressure cylinder in accordance with claim 1 in which said circular reference surfaces are of the same diameter.

4. A fluid pressure cylinder having a body with a cylindrical bore in which a piston is mounted for reciprocation, an end cap mounted on each end of the body, each end cap having a recess in a transverse face thereof, each recess having a circular outer wall, said body having a circular reference surface at each end thereof of less diameter than the exterior surface of said body, each circular surface being received in the recess of the adjacent end cap, and having a close fit with the outer wall thereof, a portion of each reference surface projecting from the adjacent end cap for a substantial distance, and said reference surfaces being concentric with said bore whereby such projecting portions may be used as reference surfaces for locating the position of the axis of said bore with respect to a structure upon which the cylinder is to be mounted.

5. A fluid pressure cylinder having a body with a cylindrical bore in which a piston having a cylindrical rod concentric therewith is mounted for reciprocation, an end cap mounted on each end of said body, at least one of said end caps having a recess with a circular outer wall, a cylindrical bearing surface for said rod within said one end cap, said bearing surface being concentric with said outer wall, said body having a circular surface at each end thereof of less diameter than the exterior surfaces of said body adjacent said circular surfaces, said circular surfaces being concentric with said bore, one of said circular surfaces having a portion received in said recess and closely fitting said outer wall whereby the axis of the rod is coincident with the axis of said bore, said circular surfaces including exposed portions projecting from said end caps a substantial distance whereby said exposed portions may be used as reference surfaces for locating said axes in a predetermined position on a structure upon which the cylinder is to be mounted.

6. A fluid pressure cylinder having a body with a cylindrical bore in which a piston is mounted for reciprocation, said body having an exposed circular reference surface at each end thereof, said reference surfaces being concentric with said bore whereby they may be used as locating surfaces for locating the position of the axis of said bore with respect to a structure upon which the cylinder is to be mounted.

7. A fluid pressure cylinder having a body with a cylindrical bore in which a piston is mounted for reciprocation, said body having exposed longitudinally aligned reference surfaces at the ends thereof, said reference surfaces being arcuate and concentric with said bore whereby they may be used as locating surfaces for locating the position of the axis of said bore with respect to a structure upon which the cylinder is to be mounted.

No references cited.